United States Patent
Lyu et al.

(10) Patent No.: US 11,600,112 B2
(45) Date of Patent: Mar. 7, 2023

(54) BIO-SECURITY SYSTEM BASED ON MULTI-SPECTRAL SENSING

(71) Applicant: Black Sesame International Holding Limited, San Jose, CA (US)

(72) Inventors: Shuen Lyu, Singapore (SG); Fangwen Tu, Singapore (SG); Bo Li, Singapore (SG); Jin Xu, Singapore (SG); Jizhang Shan, Los Gatos, CA (US)

(73) Assignee: Black Sesame Technologies Inc., San Jose, CA (US)

( * ) Notice: Subject to any disclaimer, the term of this patent is extended or adjusted under 35 U.S.C. 154(b) by 81 days.

(21) Appl. No.: 17/370,868

(22) Filed: Jul. 8, 2021

(65) Prior Publication Data

US 2023/0008297 A1  Jan. 12, 2023

(51) Int. Cl.
*G06V 40/16* (2022.01)
*G06T 5/00* (2006.01)
*G06F 21/32* (2013.01)
*G06V 40/40* (2022.01)

(52) U.S. Cl.
CPC ............ *G06V 40/172* (2022.01); *G06F 21/32* (2013.01); *G06T 5/002* (2013.01); *G06V 40/161* (2022.01); *G06V 40/45* (2022.01); *G06T 2207/10024* (2013.01); *G06T 2207/10048* (2013.01); *G06T 2207/20021* (2013.01); *G06T 2207/20024* (2013.01); *G06T 2207/20084* (2013.01)

(58) Field of Classification Search
None
See application file for complete search history.

(56) References Cited

U.S. PATENT DOCUMENTS

| | | | |
|---|---|---|---|
| 10,726,245 B2 | 7/2020 | Wen | |
| 11,138,734 B1* | 10/2021 | Passmore | G16H 50/80 |
| 11,294,996 B2* | 4/2022 | Rowe | G06N 3/0454 |
| 2007/0153871 A1 | 7/2007 | Fraden | |
| 2019/0373186 A1* | 12/2019 | Ortiz Egea | H04N 5/332 |
| 2021/0082136 A1* | 3/2021 | Nikitidis | G06T 7/20 |
| 2021/0168347 A1* | 6/2021 | Margolin | G06V 40/172 |
| 2021/0285823 A1* | 9/2021 | Gao | G01J 5/00 |
| 2021/0344852 A1* | 11/2021 | Isberg | G01J 3/0297 |
| 2021/0406350 A1* | 12/2021 | Chen | G06V 40/172 |
| 2022/0240779 A1* | 8/2022 | Peyman | A61B 5/4088 |
| 2022/0284229 A1* | 9/2022 | Liu | H04N 5/2258 |
| 2022/0313095 A1* | 10/2022 | Lichtensztein | A61B 5/0017 |

FOREIGN PATENT DOCUMENTS

WO   2018058554   4/2018

OTHER PUBLICATIONS

Benamara et al. "Efficient Multispectral Face Recognition using Random Feature Selection and PSO-SVM", 2019 Association for Computing Machinery. (Year: 2019).*

\* cited by examiner

*Primary Examiner* — Randolph I Chu
(74) *Attorney, Agent, or Firm* — Timothy T. Wang; Ni, Wang & Massand, PLLC

(57) ABSTRACT

The present invention discloses system and method for fake face identification. The system is a multi-spectral sensing based bio-security system. The system uses CNN module along with thermal sensors to detect human face and also detects the human temperature. The system authenticates a human face and in case of temperature generates an alarm as an alert.

16 Claims, 8 Drawing Sheets

BIO-SECURITY SYSTEM BASED ON MULTI-SPECTRAL SENSING

FIELD OF INVENTION

The present invention generally relates to systems and methods for recognizing a human face. More specifically, the present invention is directed to a multi-spectral fusion security system, which has the capabilities of face recognition anti-spoofing and human body temperature measurement.

BACKGROUND OF THE INVENTION

Traditionally, with the rapid development of smart devices, IoT, and artificial intelligence, face recognition technology has become an indispensable function on smart devices due to its security and contactless advantages. However, the face recognition system is very vulnerable to malicious attacks, which poses a great threat to the security of the system. Faced with malicious attacks, face recognition anti-spoofing detection has become a vital part of face recognition systems.

At present, the common ways to deceive the face recognition system are photo attacks, video attacks, and 3D mask attacks. In recent years, researches on the detection of human face and living body have developed rapidly, and many valuable research results have been obtained. Near infrared cameras, structured light/ToF sensors, light field cameras, etc. have also been used as auxiliary hardware for face recognition and anti-spoofing. In the next section, we will propose a new method of face recognition anti-spoofing, RGB camera together with IR Thermal Sensor, using the IR Thermal sensor temperature measurement function to obtain the temperature distribution of the face area, according to the face temperature distribution model to determine whether the test face is a fake face.

In recent years, some large-scale influenza and virus outbreaks have spread around the world. In 2009, there was a large-scale H1N1 influenza and a large-scale new corona virus that broke out in 2020, which bring inestimable losses to human security. Fever is one of the symptoms of infected people, but most people in concentrated areas take the body temperature of incoming and outgoing people to check the infected people. Traditional thermometers have obvious weakness in the requirements of the rapid and accurate temperature measurement of the flu/virus that has burst in. Along with face recognition anti-spoofing function, we will also propose a method for human body temperature measurement. Through the fusion of infrared thermal sensors and RGB cameras, the face temperature can be accurately measured.

An issued US patent 20070153871 assigned to Jacob Fraden discloses a technology related to a system for fast noncontact screening for fever human subjects by means of a thermal imaging camera. Furthermore, the patent discloses a device for the automatic screening of people for fever by means of a thermal imaging device. This invention provides noncontact screening through a thermal imaging camera, which is quite an expensive system, Another WO patent 2018058554 assigned to Intel Corp. discloses a technology related to a for detecting a facial image including generating a spatial convolutional neural network score for one or more detected facial images from a facial image detector. Though, the invention is advancement to the prior invention to detect the facial image using CNN module. Still, it lacks to authenticate the face in case of any hurdle as it doesn't include a temperature sensor to scan a face and authenticate it.

The present invention seeks to provide an improvement in the face recognition, more specifically, but not exclusively, in the field of CNN based face recognition. Moreover, the invention proposes a multi-spectral fusion security system, which has the capabilities of face recognition anti-spoofing and human body temperature measurement Therefore to overcome the shortcomings of the prior-arts, there is a need to provide a multi-spectral fusion security system for face recognition. Moreover, the system uses major modules as an RGB camera with an IR Thermal sensor and a CNN based module for anti-spoofing. In view of the foregoing inventions, there is a need in the art for a system to overcome or alleviate the before mentioned shortcomings of the prior arts.

It is apparent now that numerous methods and systems are developed in the prior art that are adequate for various purposes. Furthermore, even though these inventions may be suitable for the specific purposes to which they address, accordingly, they would not be suitable for the purposes of the present invention as heretofore described. Thus, there is a need for an advanced texture replacement system that recognizes textures in the background of the multimedia in real-time using a deep neural network for recognising.

SUMMARY OF THE INVENTION

A system and a method for recognizing a face using an RGB camera together with IR Thermal Sensor, using the IR Thermal sensor temperature measurement function to obtain the temperature distribution of the face area. According to the lice temperature distribution model to determine whether the test face is a fake face or a real Face.

The invention proposes a multi-spectral fusion security system, which has the capabilities of face recognition anti-spooling and human both temperature measurement. Below show major functions/modules of our system as
1. RGB camera to IR Thermal sensor calibration (online and offline)
2. CNN based temperature measurement module
3. CNN based anti-spoofing module The fusion of RGB camera and IR thermal Sensor for face recognition anti-spoofing detection is a relatively novel way at present. Different from other face recognition anti-spoofing methods, the method will combine the face information from RGB image and thermal image, and analysis the temperature distribution for face area with our own face temperature distribution model. Due to the different emissivity of infrared thermal radiation for different objects, it is difficult to simulate the temperature distribution of real faces in photos, videos, or 3D masks, which greatly reduces the difficulty of detecting fake faces. At the same time, our proposed system can accurately measure the temperature of the human face. During an epidemic outbreak, it can perform fast, contactless fever detection in areas.

The primary objective of the invention is to provide a bio-security based face recognition system for recognizing a face, where the face recognition system including an imaging module and a convolutional neural network (CNN) based module. The imaging module includes an RGB camera unit and an IR thermal sensor unit.

The RGB camera unit consists an offline calibrator and an online calibrator. The offline calibrator calibrates the face with a calibration board to generate a first calibrated face. The online calibrator rectifies errors in the first calibrated face to generate a second calibrated face.

The IR thermal sensor unit comprises of a thermal extractor, multiple filters and a calibrator. The thermal extractor extracts a first thermal image of the face. The multiple filters includes a temporal filter and a spatial filter. The temporal filter eliminates noise from the first thermal image to generate a second thermal image. The spatial filter divides the second thermal image to a plurality of grid cells. The spatial filter identifies temperature distribution among the plurality of grid cells. The calibrator identifies a grid cell with highest temperature from the plurality of grid cells, further the calibrator eliminates a temperature drift front the grid cell to generate a calibrated grid cell.

The Convolutional Neural Network (CNN) based module includes a temperature measurement unit and a anti-spoofing unit. The temperature distribution of the plurality of grid cells with a predefined template to authenticate the face. The anti-spoofing unit analyzes the calibrated grid cell and the second calibrated face to authenticate the face.

The other objective of the invention is to provide a method and a system to measure the temperature for face area, our system include following modules and follow steps as—applying face detector to the RGB image, to get the bounding box info of faces. Then, mapping the face bounding boxes to thermal image with a calibration function. Applying temporal filters, kalman filter and rolling average to eliminate the noise. Followed with applying spatial filters, otsu algorithm and median filter to get the read out temperature. Then, compensating the readout temperature to human body core temperature, where blackbody calibration is used to solve time drift problem, we use a blackbody to calibrate the compensation factor daily.

Another objective of the invention is to provide the face recognition system further authenticates the face based on one or more bio-attributes. Further, the bio-attributes include either of a forehead, a tear gland and a neck.

The yet another objective of the invention is to provide the face recognition system including an RGB camera unit to detect one or more features from the face including gender, glasses, pose, hair mask or face mask.

Other objectives and aspects of the invention will become apparent from the following detailed description, taken in conjunction with the accompanying drawings, which illustrate, by way for example, the features in accordance with embodiments of the invention.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

Although, the invention is described above in terms of various exemplary embodiments and implementations, it should be understood that the various features, aspects, and functionality described in one or more of the individual embodiments are not hunted in their applicability to the particular embodiment with which they are described, but instead can be applied, alone or in various combinations, to one or more of the other embodiments of the invention, whether or not such embodiments are described and whether or not such features are presented as being a part of a described embodiment. Thus, the breadth and scope of the present invention should not be limited by any of the above-described exemplary embodiments.

The presence of broadening words and phrases such as "one or more," "at least," "but not limited to" or other like phrases in some instances shall not be read to mean that the narrower case is intended or required in instances where such broadening phrases may be absent.

BRIEF DISCRIPTION OF THE DRAWINGS

The objects and features of the present invention will become more fully apparent from the following description and appended claims, taken in conjunction with the accompanying drawings. Understanding that these drawings depict only typical embodiments of the invention and are, therefore, not to be considered limiting of its scope, the invention will be described and explained with additional specificity and detail through the use of the accompanying drawings in which:

FIG. 1 1 illustrates a face recognition system in accordance with the present invention;

DETAILED DESCRIPTION OF THE DRAWINGS

Figure 1:
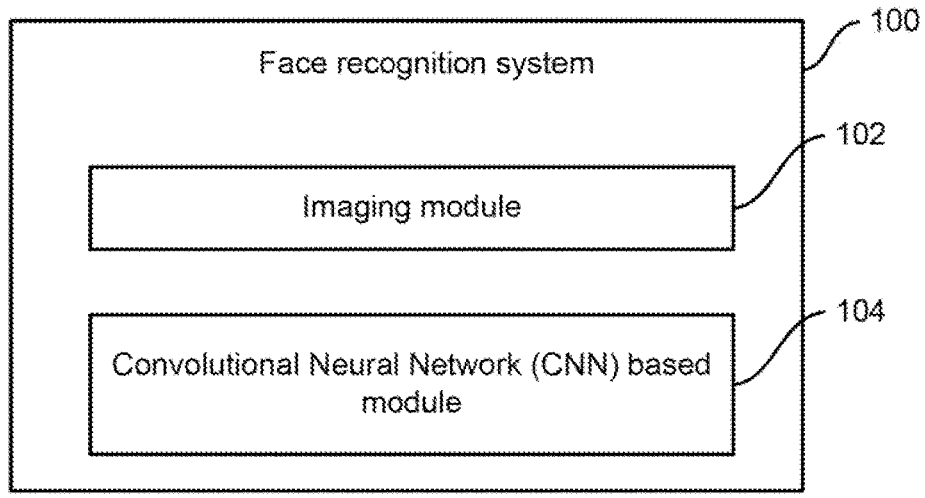

Last few years, with the rapid development of smart devices, IoT, and artificial intelligence, face recognition technology has become an indispensable function on smart devices due to its security and contactless advantages. However, the face recognition system is very vulnerable to malicious attacks, which poses a great threat to the security of the system. Faced with malicious attacks, face recognition anti-spoofing detection has become a vital part of face recognition systems.

At present, the common ways to deceive the face recognition system are photo attacks, video attacks, and 3D mask attacks. In recent years, researches on the detection of human face and living body have developed rapidly, and many valuable research results have been obtained. Near infrared cameras, structured light/ToF sensors, light field cameras, etc. have also been used as auxiliary hardware for face recognition and anti-spoofing. In the next section, we will propose a new method of face recognition anti-spoofing, RGB camera together with IR Thermal Sensor, using the. IR Thermal sensor temperature measurement function to obtain the temperature distribution of the face area, according to the thee temperature distribution model to determine whether the test face is a fake face.

In recent years, some large-scale influenza and virus outbreaks have spread around the world. In 2009, there was a large-scale H1N1 influenza and a large-scale new coronavirus that broke out in 2020, which bring inestimable losses to human security. Fever is one of the symptoms of infected people, but most people in concentrated areas take the body temperature of incoming and outgoing people to check the infected people. Traditional thermometers have obvious weakness in the requirements of the rapid and accurate temperature measurement of the flu virus that has burst in [6]. Along with thee recognition anti-spoofing function, we will also propose a method for human body temperature measurement. Through the fusion of infrared thermal sensors and RGB cameras, the face temperature can be accurately measured.

The presents invention is a multi-spectral system of RGB camera and IR thermal sensor. The system can authenticate user's identity, defend fake attack, measure the bio-attributes include temperature of special part of body such face forehead, tear gland and neck. A system and a method for recognizing a face using an RGB camera together with IR Thermal Sensor, using the IR Thermal sensor temperature measurement function to obtain the temperature distribution of the face area. According to the face temperature distribution model to determine whether the test face is a fake face or a real face.

The invention proposes a multi-spectral fusion security system, which has the capabilities of face recognition anti-spoofing, and human body temperature measurement. Major functions/modules of the system are
1. RGB camera to IR Thermal sensor calibration (online and offline)
2. CNN based module The fusion of RGB camera and IR thermal Sensor for face recognition anti-spoofing detection is a relatively novel way at present. Different from other face recognition anti-spoofing methods, the method will combine the face information from RGB image and thermal image, and analysis the temperature distribution for face area with our own face temperature distribution model. Due to the different emissivity of infrared thermal radiation for different objects, it is difficult to simulate the temperature distribution of real faces in photos, videos, or 3D masks, which greatly reduces the difficulty of detecting fake faces. At the same time, our proposed system can accurately measure the temperature of the human face. During an epidemic outbreak, it can perform fast, contactless fever detection in areas.

FIG. 1 illustrates a face recognition system of the present invention. The face recognition system 100 is a multi-spectral bio-security based face recognition system. the face recognition system including an imaging module 102 and a convolutional neural network (CNN) based module 104. The imaging module 102 includes an RGB camera unit and an IR thermal sensor unit.

The RGB camera unit consists an offline calibrator and an online calibrator. The offline calibrator calibrates the face with a calibration board to generate a first calibrated face. The online calibrator rectifies errors in the first calibrated face to generate a second calibrated face.

The IR thermal sensor unit comprises of a thermal extractor, multiple filters and a calibrator. The thermal extractor extracts a first thermal image of the face. The multiple filters includes a temporal filter and a spatial filter. The temporal filter eliminates noise front the first thermal image to generate a second thermal image. The spatial filter divides the second thermal image to a plurality of grid cells. The spatial filter identities temperature distribution among the plurality of grid cells. The calibrator identifies a grid cell with highest temperature from the plurality of grid cells, further the calibrator eliminates a temperature drift from the grid cell to generate a calibrated grid cell.

The Convolutional Neural Network (CNN) based module 104 includes a temperature measurement unit and an anti-spoofing unit. The temperature distribution of the plurality of grid cells with a predefined template to authenticate the face. The anti-spoofing unit analyzes the calibrated grid cell and the second calibrated face to authenticate the face.

The face recognition system is a multi-spectral fusion security system. Further, the multi-spectral fusion security system is based on anti-spoofing and temperature measurement of the face.

Moreover, the face recognition system further authenticates the face based on one or more bio-attributes. Primarily, the bio-attributes include a forehead and alternatively is may include a tear gland or a neck.

The calibration board in the offline calibrator is a multi-modal calibration board. Moreover, the multi-modal calibration board is a black-white calibration board with one or more heating devices. The one or more heating devices adjust temperature of the plurality of grid cells. Furthermore, the multi-modal calibration board forms one or more calibration patterns. The one or more calibration patterns includes either of a rectangle pattern, a circle pattern and a chess pattern.

The RGB camera unit detects one or more features from the face including gender, glasses, pose, hair mask or face mask. The face recognition system generates an alarm based on temperature of the calibrated grid cell above the pre-defined threshold and authenticates a human face.

Figure 2:
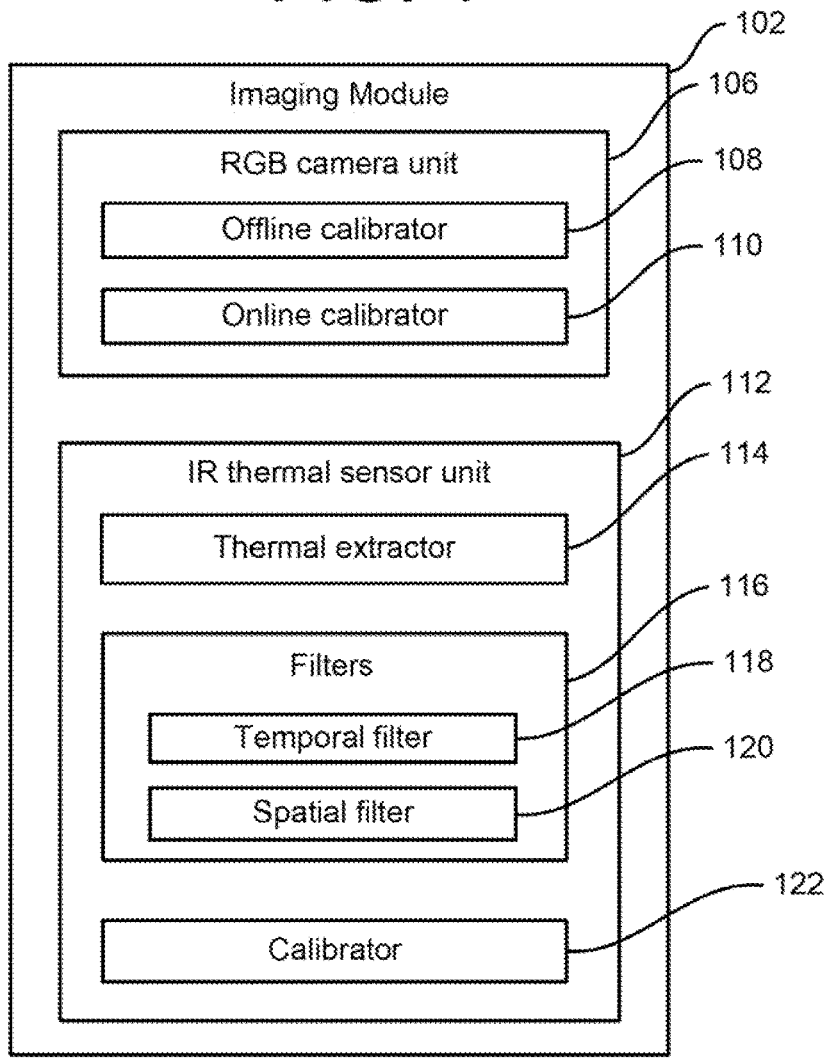
FIG. 2 illustrates an Imaging module of the face recognition system.

FIG. 2 illustrates an Imaging module of the face recognition system. The imaging module 102 includes an RGB camera unit 106 and an IR thermal sensor unit 112. The RGB camera unit 106 consist of an offline calibrator 108 and an online calibrator 110. The offline calibrator 108 calibrates the face with a calibration board to generate a first calibrated face. The online calibrator 110 rectifies errors in the first calibrated face to generate a second calibrated face.

The calibration board is a multi-modal calibration board is. In addition to traditional black-white calibration board of RGB camera 106, a novel board with attached heating devices. The devices are able to adjust temperature to ensure good saliency on thermal image for feature detection, matching and stereo calibration. The calibration pattern can be square pattern, rectangle pattern, circle pattern or the other designed random pattern.

The IR thermal sensor unit 112 comprises of a thermal extractor, multiple filters and a calibrator. The thermal extractor 114 extracts a first thermal image of the face. The multiple filters 116 includes a temporal filter 118 and a spatial filter 120. The temporal filter 118 eliminates noise from the first thermal image to generate a second thermal image. The spatial filter 120 divides the second thermal image to a plurality of grid cells.

Moreover, the spatial filter 120 identifies temperature distribution among the plurality of grid cells. The calibrator 122 identifies a grid cell with highest temperature from the plurality of grid cells, further the calibrator eliminates a temperature drift from the grid cell to generate a calibrated grid cell.

Online calibration is applied to rectify the errors that exist in offline calibration such as the white bounding box in thermal image. The distance of human face is modelled to be proportional to the height if bounding box on face. Thus, a linear mapping is estimated to convert bounding box height into real world distance for re-projection.

With this setup, 3 rotation, 3 translation parameters, focal length of RGB camera and thermal camera as well as the depth fitting coefficients are able to be tuned online. Thus, to efficiently achieve the goal, a user-friendly UI is designed with visualization of features on both images and tracking bar to adjust the parameters continuously. User can smoothly adjust all the parameters without any concern about the position relationship of the target cameras in actual configuration.

This multi-spectral system includes an RGB camera and IR thermal sensor. The system can authenticate user's identity, defend fake attack, measure the bio-attributes include temperature of special part of body such face forehead, tear gland and neck.

Figure 3:
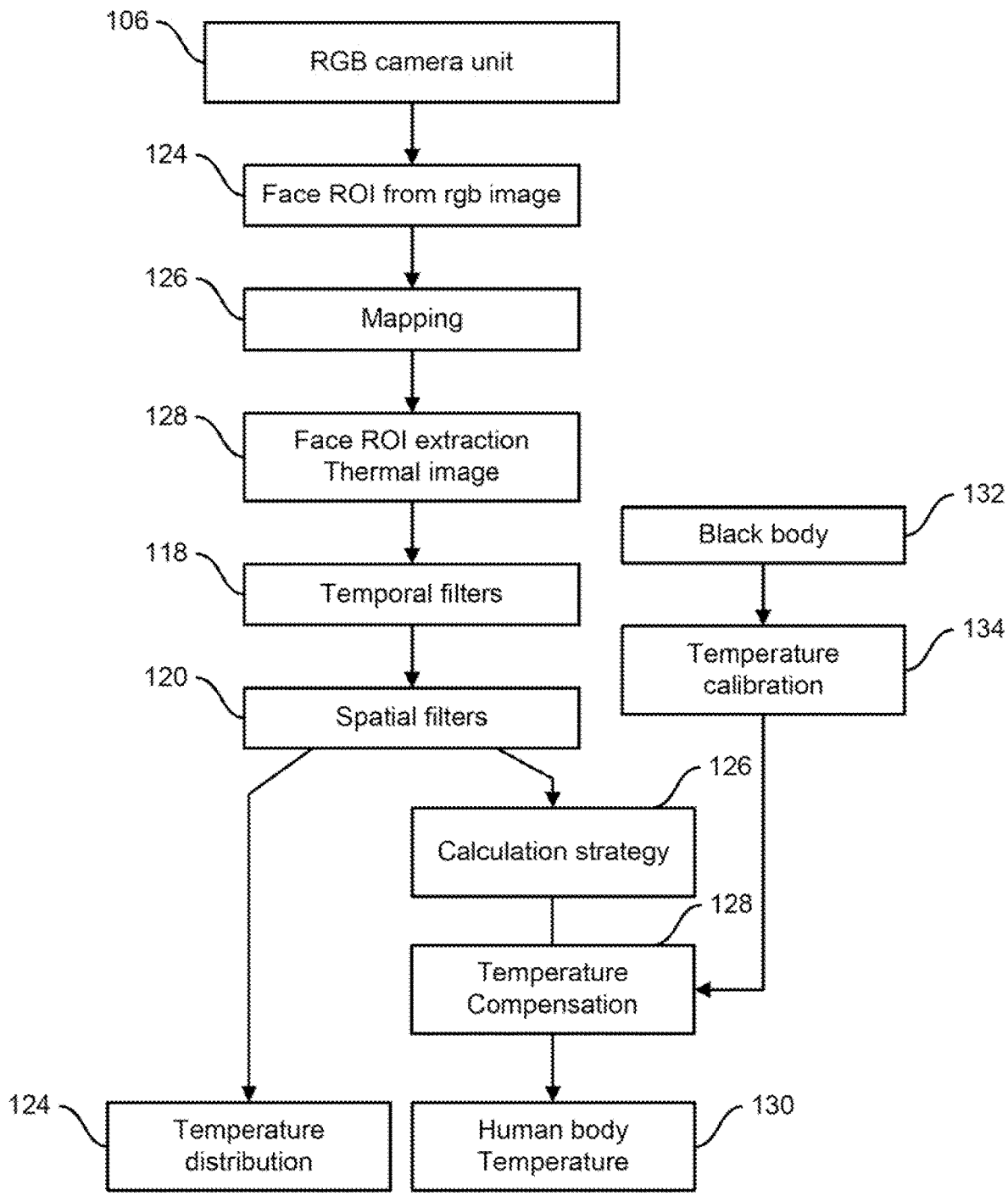
FIG. 3 illustrates a workflow of a human temperature measure system of the face recognition system.

FIG. 3 illustrates a workflow of a human temperature measure system of the face recognition system. In order to measure the temperature for face area, our system include following modules and steps as applying face detector to the RGB image through the RGB camera unit 106, to get the bounding box info of faces. Mapping 126 the face (ROI) 124 bounding boxes to thermal image 128 with the calibration function. Apply temporal filters 118, kalman filter and rolling average to eliminate the noise. Applying spatial filters 120, otsu algorithm and median filter to get the read out temperature distribution 124. Compensating the readout temperature to human body core temperature using a calculation strategy 126. The blackbody 132 calibration is used to solve time drift problem, we use a blackbody for temperature calibration 134 to calibrate the compensation factor daily.

Temperature compensation, is used as a regression method to obtain the distance-dependent compensation coefficient. The size of the face information in the RGB map and the readout temperature map of the thermal sensor are used as inputs, and the temperature measurement of the forehead gun is used as the output human body temperature 130. A curve is fitted to a large amount of data collected to obtain a compensation coefficient. Another compensation, is applied when the face attributes of gender, glasses, hair mask, pose, face mask is recognized. The figures shows the temperature measurement and alarm system.

The temperature measurement of the thermal sensor is affected by many factors, including its own characteristics, temperature drift, noise level, etc., as well as some factors of the tester itself, such as occlusion, attitude, age, and gender. In addition, it will also receive Influence of external environment, such as ambient temperature, light intensity, etc. For the influence of its own characteristics, it is mainly temperature drift and noise level. Aiming at these two influencing factors, we use time-domain filtering and space-domain filtering to reduce the impact on the algorithm. Kalman filtering can be used to eliminate the problem of temperature drift to some extent temperature measurement noise. In hardware, we use blackbody timing to correct the thermal sensor's compensation coefficient, which greatly solves the temperature measurement error caused by temperature drift over time.

For the influencing factors of the testers themselves, the main influencing factors are face occlusion and face posture. In order to eliminate the impact of Pace occlusion (including glasses, bangs, masks and etc.), we first tried to use the detection of key points on the face, tracked the forehead part, and obtained the temperature of the forehead part; this way eliminated the effect of glasses and mask for temperature measurement, but in the case of bangs, it will also sometimes cause a large temperature measurement error. Therefore, we tried to divide the face area into MxN grid cells, and measured the temperature of each grid separately. Taking the grid with the largest temperature value as the overall temperature measurement result, this method not only excludes the effects of glasses, masks and hangs, but also reduces the temperature measurement error to a certain extent.

Figure 4:
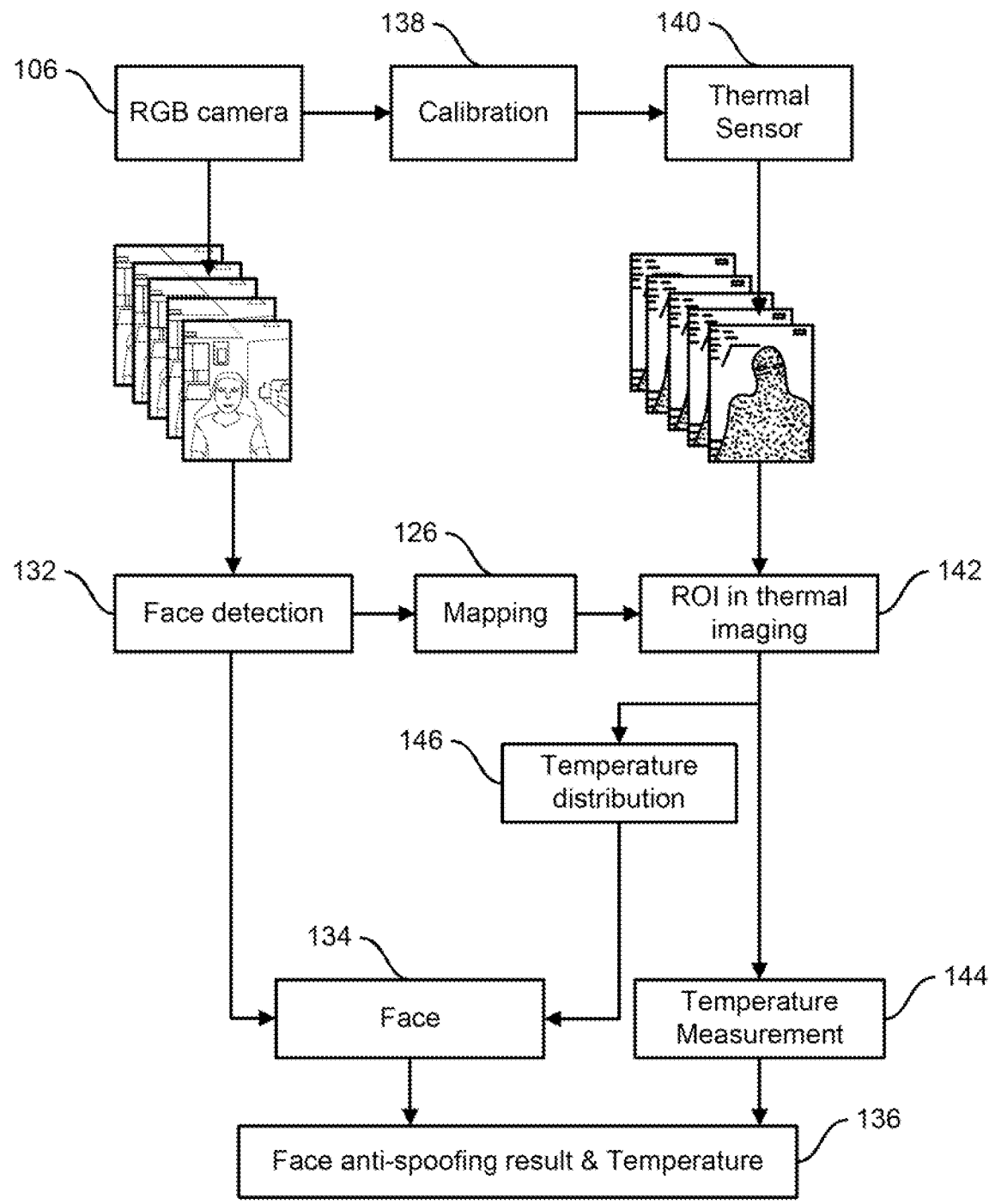
FIG. 4 illustrates a workflow of online/offline calibration of the imaging module in view of sensors.

FIG. 4 illustrates a workflow of online/offline calibration of the imaging module in view of sensors. The new pipeline of offline and online calibration system proposed. Calibration 138 with one calibration board and refine using online cases, which makes installation of new equipment become easier and faster.

The multi-spectral system includes a RGB camera 106 and IR thermal sensor 140. The system can authenticate user's identity for face detection 132, defend fake attack, measure the bio-attributes include temperature of special part of body such face forehead, tear gland and neck for temperature distribution 146. The figure shows the major modules and workflow of our system.

In the workflow the RGB camera detects a face and is simultaneously calibrated with a thermal sensor. The detected face is mapped, the region of interest (ROI) in thermal imaging 142.

Figure 5A:
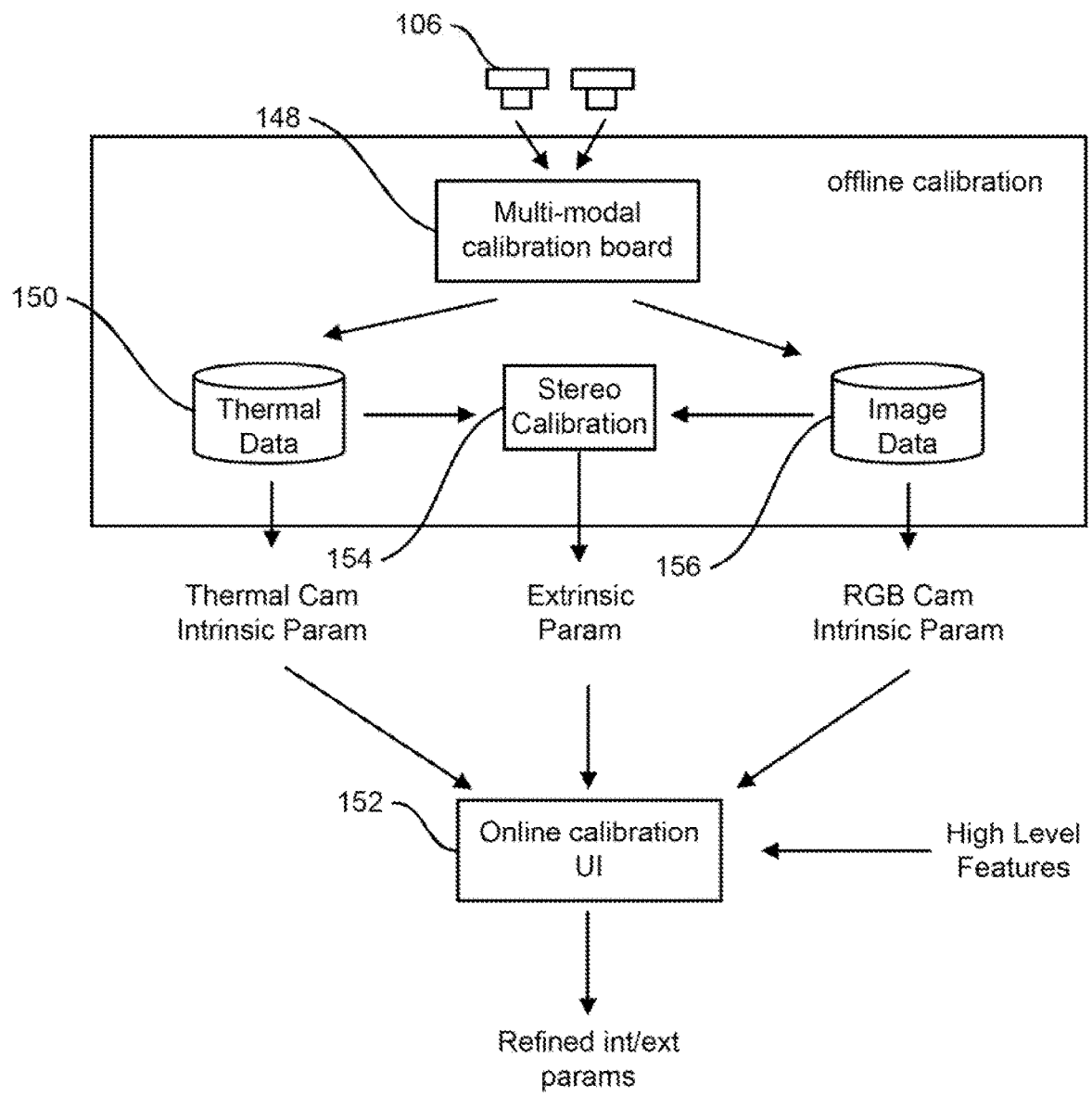
FIG. 5a illustrates a workflow of online/offline calibration of the imaging module.

FIG. 5a illustrates a workflow of online/offline calibration of the imaging module. For calibration camera system 106 calibration, a lot method is proposed to extract parameters of single or between multi camera calibration. In this innovation, a multi-modal calibration board 148 is innovated. In addition to traditional black-white calibration board of RGB camera, this patent presents a novel board with attached heating devices. The devices are able to adjust temperature to ensure good saliency on thermal data 150 or thermal image 156 for feature detection, matching and stereo calibration 154. The calibration pattern can be square pattern, rectangle pattern, circle pattern or the other designed random pattern. FIG. 3 just show normal check board pattern as example.

Online calibration 152 is applied to rectify the errors that exist in offline calibration such as the white bounding box in thermal image.

The method is to project 2d points on RGB images to 3D world coordinate with intrinsic parameters and estimated depth. Then with the extrinsic parameters between the two camera and intrinsic parameter of thermal camera, the 3D points are re-projected to the 2d display planes. Among this procedure, features that can represent target depth can be used to estimate the depth. The features in real world coordinate and its corresponding reflection on image plane should be able to code into certain regression models. For instance, in this case, the distance of human face is modeled to be proportional to the height if bounding box on face. Thus, a linear mapping is estimated to convert bounding box height into real world distance for re-projection.

With this setup, 3 rotation, 3 translation parameters, focal length of RGB camera and thermal camera as well as the depth fitting coefficients are able to be tuned online. Thus, to efficiently achieve the goal, a user-friendly UI is designed with visualization of features on both images and tracking bar to adjust the parameters continuously. User can smoothly adjust all the parameters without any concern about the position relationship of the target cameras in actual configuration.

Figure 5B:
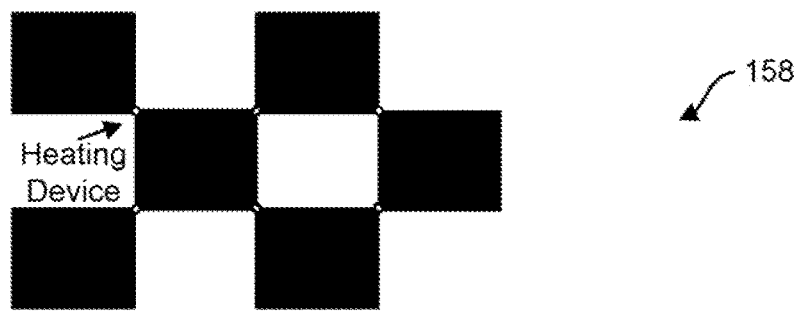
FIG. 5b illustrates a multi-modal calibration board.

FIG. 5b illustrates a multi-modal calibration board. The multi-modal calibration board is innovated. In addition to traditional black-white calibration board of RGB camera, this patent presents a novel board with attached heating devices. The devices are able to adjust temperature to ensure good saliency on thermal image for feature detection, matching and stereo calibration. The calibration pattern can be square pattern, rectangle pattern, circle pattern or the other designed random pattern like a chess board 158.

Figure 6:
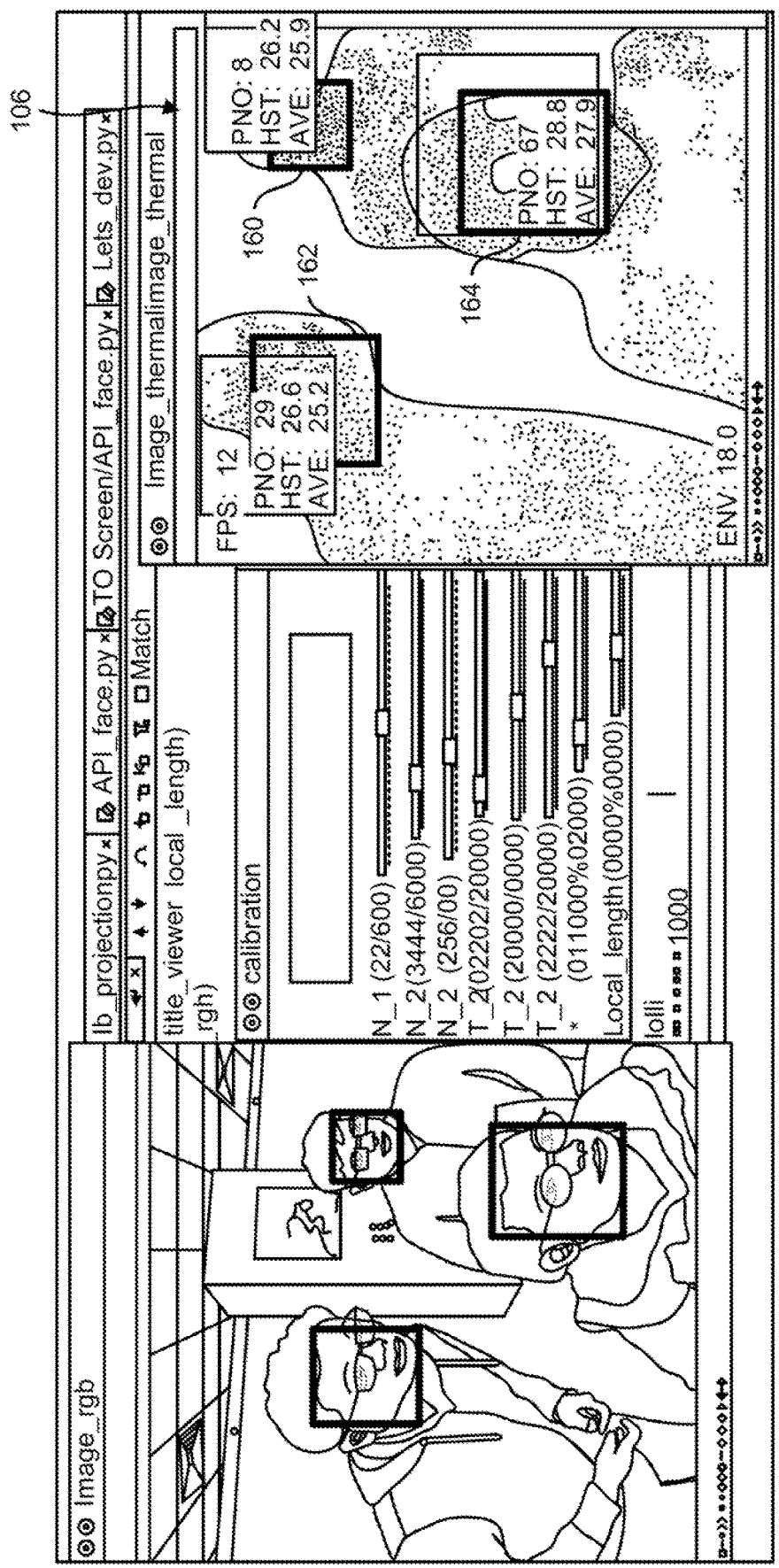
FIG. 6 illustrates a fast deployable UI in the present invention.

FIG. 6 illustrates a fast deployable UI in the present invention. The combination of the thermal image and the three RGB channels into four-channel data is used as the input of the convolutional neural network and the output is the face Test information and spoofing test results. The method of face recognition anti-spoofing, RGB camera together with IR Thermal Sensor displaying Red 160, green 162 and blue 164 zones, using the IR Thermal sensor temperature measurement function to obtain the temperature distribution of the face area, according to the face temperature distribution model to determine whether the test face is a fake face.

Figure 7:
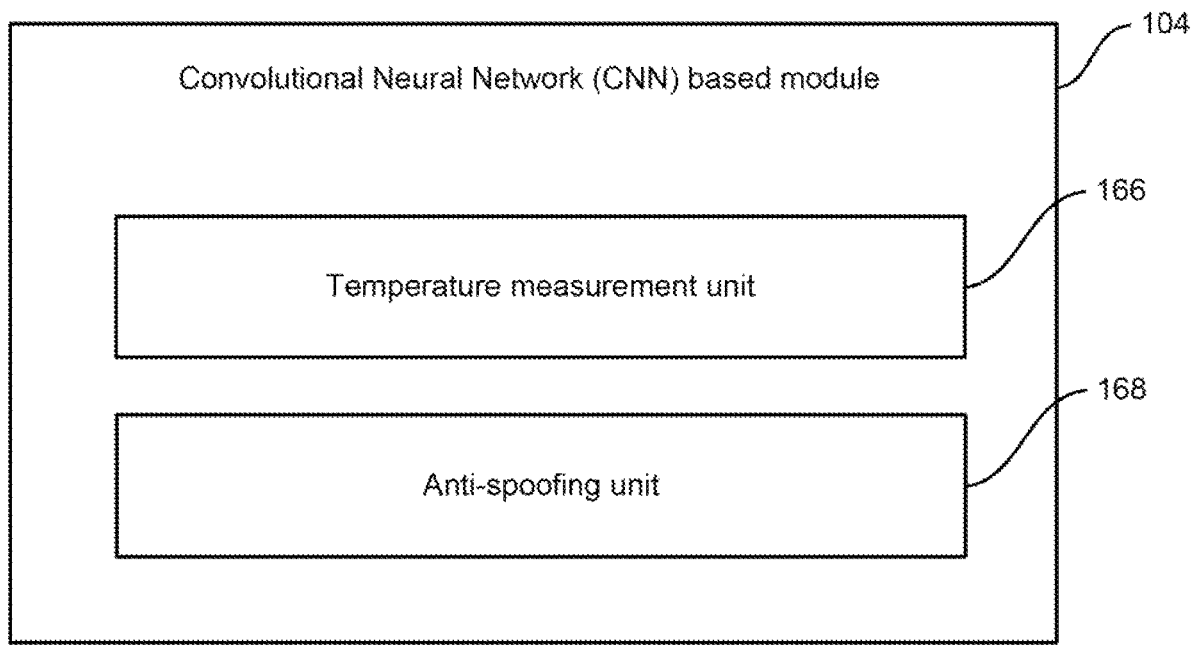
FIG. 7 illustrates a Convolutional Neural Network (CNN) based module.

FIG. 7 illustrates a Convolutional Neural Network (CNN) based module. The CNN based module a includes a temperature measurement unit 166 and an anti-spooling unit 168. The temperature measurement unit 166 compares the temperature distribution of the plurality of grid cells with a predefined template to authenticate the face. The anti-spoofing unit 168 analyzes the calibrated grid cell and the second calibrated face to authenticate the face.

The temperature measurement of the thermal sensor is affected by many factors, including its own characteristics, temperature drift, noise level, etc.[8], as well as some factors of the tester itself, such as occlusion, attitude, age, and gender. In addition, it will also receive Influence of external environment, such as ambient temperature, light intensity, etc. For the influence of its own characteristics, it is mainly temperature drift and noise level. Aiming at these two influencing factors, we use time-domain filtering and space-domain filtering to reduce the impact on the algorithm. Kalman filtering can be used to eliminate the problem of temperature drift to some extent. Temperature measurement noise. In hardware, we use blackbody timing to correct the thermal sensors compensation coefficient, which greatly solves the temperature measurement error caused by temperature drift over time.

For the influencing, factors of the testers themselves, the main influencing factors are face occlusion and face posture. In order to eliminate the impact of face occlusion (including glasses, bangs, masks and etc.), we first tried to use the detection of key points on the face, tracked the forehead part, and obtained the temperature of the forehead part; this way eliminated the effect of glasses and mask for temperature measurement, but in the case of bangs, it will also sometimes cause a large temperature measurement error. Therefore, we tried to divide the face area into MxN grid cells, and measured the temperature of each grid separately. Taking the grid with the largest temperature value as the overall temperature measurement result, this method not only excludes the effects of glasses, masks and bangs, but also reduces the temperature measurement error to a certain extent.

The invention proposes two spoofing detection methods. The first (shows as FIG. 8), spoofing detection and face detection are performed separately, with thermal map of face area as input, and a deep learning convolutional neural network is used to train a two-class model. Second method, the face detection and spoofing detection functions are implemented with a neural network. The combination of the thermal image and the three RGB channels into four-channel data is used as the input of the convolutional neural network and the output is the face Test information and spoofing test results.

Figure 8:
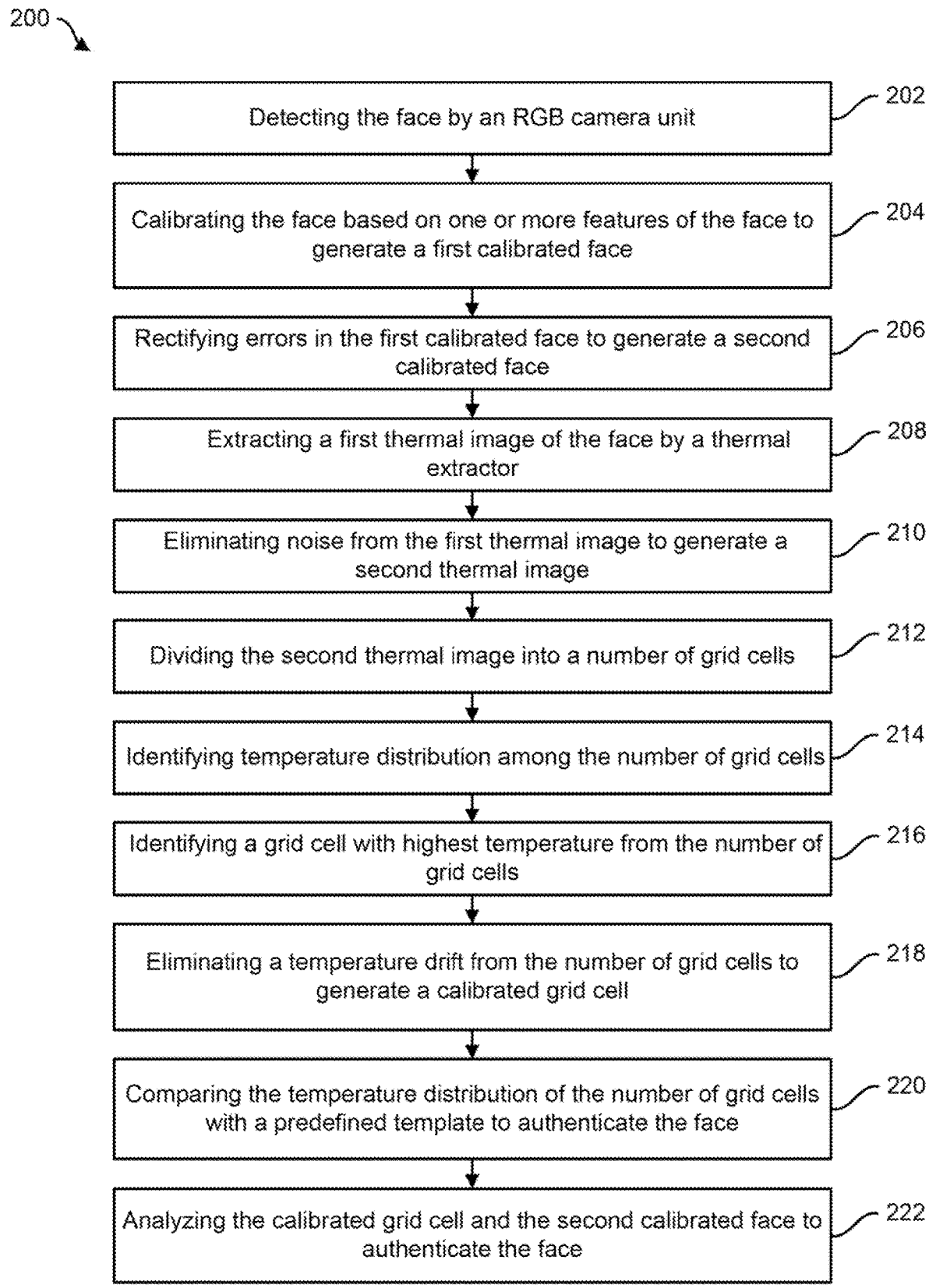
FIG. 8 illustrates a method for recognizing a face.

FIG. 8 illustrates a method for recognizing a face 200. The method includes firstly, detecting the face by an RGB camera unit 202. Secondly, calibrating the face based on one or more features of the face to generate a first calibrated face 204. Followed by, rectifying errors in the first calibrated face to generate a second calibrated face 206. Later, extracting a first thermal image of the face by a thermal extractor 208. Then eliminating noise from the first thermal image to generate a second thermal image 210. Dividing the second thermal image into a number of grid cells 212. Identifying temperature distribution among the number of grid cells 214 and identifying a grid cell with highest temperature from the number of grid cells 216. Then, eliminating a temperature drift from the number of grid cells to generate a calibrated grid cell 218. Comparing the temperature distribution of the number of grid cells with a predefined template to authenticate the face 220. Finally, analyzing the calibrated grid cell and the second calibrated face to authenticate the face 222.

Figure 9:
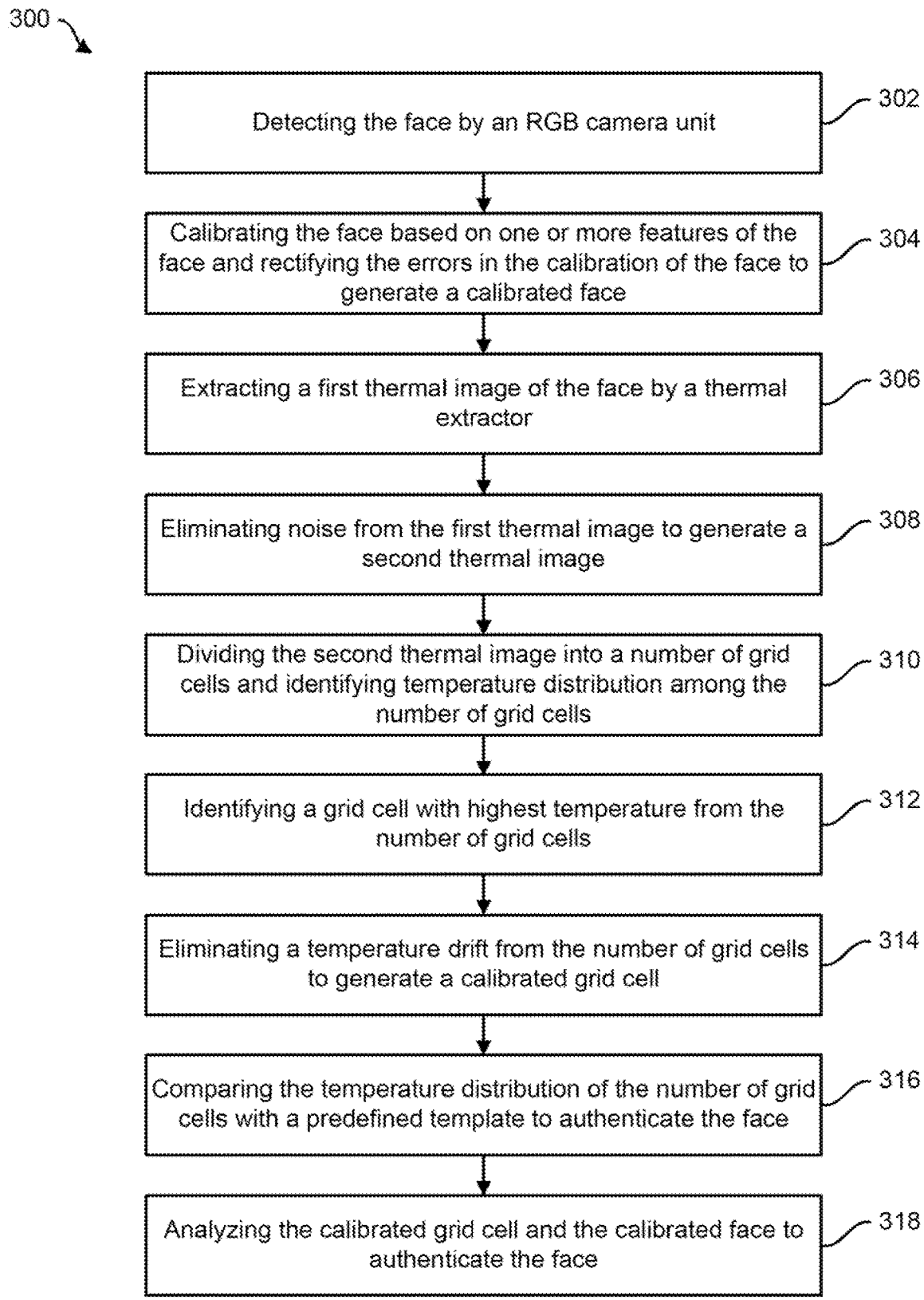
FIG. 9 illustrates a method for face recognition based on multispectral sensing.

FIG. 9 illustrates a method for face recognition based on multispectral sensing 300. Firstly, detecting the face by an RGB camera unit 302. Secondly, calibrating the face based on one or more features of the face and rectifying the errors in the calibration of the face to generate a calibrated face 304. Followed by, extracting a first thermal image of the face by a thermal extractor 306. Then eliminating noise from the first thermal image to generate a second thermal image 308. Followed by, dividing the second thermal image into a number of grid cells and identifying temperature distribution among the number of grid cells 310. Identifying a grid cell with highest temperature from the number of grid cells 312. Then, eliminating a temperature drift from the number of grid cells to generate a calibrated grid cell 314. Finally, comparing the calibrated grid cell and the calibrated face to authenticate the face 316 and analyzing the temperature distribution of the number of grid cells with a predefined template to authenticate the face 318.

While the various embodiments of the present invention have been described above, it should be understood that they have been presented by way of example only, and not of limitation. Likewise, the figure may depict an example architectural or other configuration for the invention, which is done to aid in understanding the features and functionality that can be included in the invention. The invention is not restricted to the illustrated example architectures or configurations, but the desired features can be implemented using a variety of alternative architecture and configurations.

Although, the invention is described above in terms of various exemplary embodiments and implementations, it should be understood that the various features, aspects, and functionality described in one or more of the individual embodiments are not limited in their applicability to the particular embodiment with which they are described, but instead can be applied, alone or in various combinations, to one or more of the other embodiments of the invention, whether or not such embodiments are described and whether or not such features are presented as being a part of a described embodiment. Thus, the breadth and scope of the present invention should not be limited by any of the above-described exemplary embodiments.

The presence of broadening words and phrases such as "one or more," "at least," "but not limited to" or other like phrases in sonic instances shall not be read to mean that the narrower case is intended or required in instances where such broadening phrases may be absent.

The invention claimed is:

1. A bio-security based face recognition system for recognizing a face, wherein the recognition system comprising:
   an imaging module, wherein the imaging module comprising:
   an RGB camera unit to detect the face, wherein the RGB camera unit comprising:
   an offline calibrator, wherein the offline calibrator calibrates the face with a calibration board to generate a first calibrated face; and an online calibrator, wherein the online calibrator rectifies errors in the first calibrated face to generate a second calibrated face; and an IR thermal sensor unit, wherein the IR thermal sensor unit comprising;

a thermal extractor, wherein the thermal extractor extracts a first thermal image of the face;

a plurality of filters, wherein the plurality of filters comprising:

a temporal filter for eliminating noise from the first thermal image to generate a second thermal image; and a spatial filter for dividing the second thermal image to a plurality of grid cells, wherein the spatial filter identifies temperature distribution among the plurality of grid cells;

a calibrator, wherein the calibrator identifies a grid cell with highest temperature from the plurality of grid cells, further wherein the calibrator eliminates a temperature drift from the grid cell to generate a calibrated grid cell;

a Convolutional Neural Network (CNN) based module, wherein the Convolutional Neural Network (CNN) based module comprising:

a temperature measurement unit for comparing the temperature distribution of the plurality of grid cells with a predefined template to authenticate the face; and an anti-spoofing unit, wherein the anti-spoofing unit analyzes the calibrated grid cell and the second calibrated face to authenticate the face.

2. The face recognition system in accordance with claim 1, wherein the face recognition system is a multi-spectral fusion security system.

3. The face recognition system in accordance with claim 2, wherein the multi-spectral fusion security systems is based on anti-spoofing and temperature measurement of the face.

4. The face recognition system in accordance with claim 1, wherein the face recognition system further authenticates the face based on one or more bio-attributes.

5. The face recognition system in accordance with claim 4, wherein the bio-attributes include either of a forehead, a tear gland and a neck.

6. The face recognition system in accordance with claim 1, wherein the calibration board is a multi-modal calibration board.

7. The face recognition system in accordance with claim 6, wherein the multi-modal calibration board is a black-white calibration board with one or more beating devices.

8. The face recognition system in accordance with claim 7, wherein the one or more heating devices adjusts temperature of the plurality of grid cells.

9. The face recognition system in accordance with claim 7, wherein the multi-modal calibration board forms one or more calibration patterns.

10. The face recognition system in accordance with claim 9, wherein the one or more calibration patterns includes either of a rectangle pattern, a circle pattern and a chess pattern.

11. The face recognition system in accordance with claim 1, wherein the RGB camera unit detects one or more features from the face including gender, glasses, pose, hair mask or face mask.

12. The face recognition system in accordance with claim 1, wherein the face recognition system generates an alarm based on temperature of the calibrated grid cell above the pre-defined threshold.

13. The face recognition system in accordance with claim 1, wherein the face recognition system authenticates a human face.

14. A bio-security based multispectral face recognition system for recognizing a human face, wherein the multispectral face recognition system comprising:

an imaging module, wherein the imaging module comprising:

an RGB camera unit to detect the human face, wherein the RGB camera unit includes an offline calibrator and an online calibrator, further wherein the offline calibrator calibrates the human face based on one or more features of the human face to generate a first calibrated face, further wherein the online calibrator rectifies errors in the first calibrated face to generate a second calibrated face; and an IR thermal sensor unit for extracting first thermal image of the human face, wherein IR thermal sensor unit;

a pair of filters including a temporal filter and a spatial filter, wherein the temporal filter eliminates noise from the first thermal image to generate a second thermal image, further wherein the spatial filter divides the second thermal image to a plurality of grid cells further wherein the spatial filter identifies temperature distribution among the plurality of grid cells; and a calibrator, wherein the calibrator identifies a grid cell with highest temperature from the plurality of grid cells and eliminates a temperature drift from the grid cell to generate a calibrated grid cell;

a Convolutional Neural Network (CNN) based module, wherein the Convolutional Neural Network (CNN) based module comprising;

a temperature measurement unit for comparing the temperature distribution of the plurality of grid cells with a predefined template to authenticate the human face; and an anti-spoofing unit, wherein the anti-spoofing unit analyzes the calibrated grid cell and the second calibrated face to authenticate the human face.

15. A method, for recognizing a face, wherein the method comprising:

detecting the face by an RGB camera unit;

calibrating the face based on one or more features of the face to generate a first calibrated face;

rectifying errors in the first calibrated face to generate a second calibrated face;

extracting a first thermal image of the face by a thermal extractor;

eliminating noise from tide first thermal image to generate a second thermal image;

dividing the second thermal image into a number of grid cells, identifying temperature distribution among the number of grid cells;

identifying a grid cell with highest temperature from the number of grid cells, eliminating a temperature drift from the number of grid cells to generate a calibrated grid cell;

comparing the temperature distribution of the number of grid cells with a predefined template to authenticate the face; and analyzing the calibrated grid cell and the second calibrated face to authenticate the face.

16. A method for face recognition based on multispectral sensing, wherein the method comprising:

detecting the face by an RGB camera unit;

calibrating the face based on one or more features of the face and rectifying the error in the calibration of the face to generate a calibrated face;

extracting a first thermal image of the face by a thermal extractor;

eliminating noise from the first thermal image to generate a second thermal image;

dividing the second thermal image into a number of grid cells and identifying temperature distribution among the number of grid cells;

identifying a grid cell with highest temperature from the number of grid cells, eliminating a temperature drift from the number of grid cells to generate a calibrated grid cell;

analyzing the calibrated grid cell and the calibrated face to authenticate the face; and comparing the temperature distribution of the number of grid cells with a predefined template to authenticate the face.

* * * * *